(No Model.)

R. B. HAIN.
BICYCLE SADDLE.

No. 420,009.

Patented Jan. 21, 1890.

WITNESSES:
Adolph B. Mason
Grace G. Chapman.

INVENTOR
Ralph B. Hain
BY Cyrus E. Perkins
his ATTORNEY.

UNITED STATES PATENT OFFICE.

RALPH BENTON HAIN, OF GRAND RAPIDS, MICHIGAN, ASSIGNOR TO THE GRAND RAPIDS CYCLE COMPANY, OF SAME PLACE.

BICYCLE-SADDLE.

SPECIFICATION forming part of Letters Patent No. 420,009, dated January 21, 1890.

Application filed October 15, 1889. Serial No. 327,125. (No model.)

*To all whom it may concern:*

Be it known that I, RALPH BENTON HAIN, a citizen of the United States, residing at Grand Rapids, in the county of Kent and State of Michigan, have invented certain new and useful Improvements in Bicycle Saddles; and I do declare the following to be a full, clear, and exact description of the invention, such as will enable others skilled in the art to which it appertains to make and use the same, reference being had to the accompanying drawings, and to the letters of reference marked thereon, which form a part of this specification.

Figure 1:
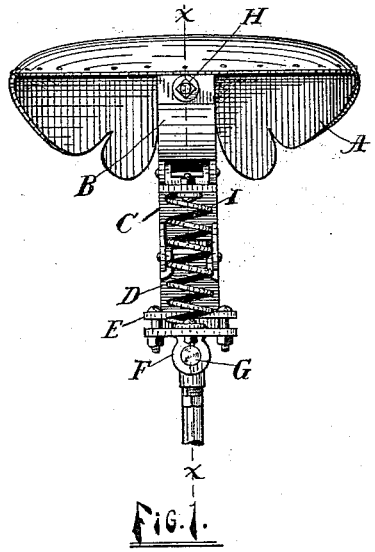
Figure 2:
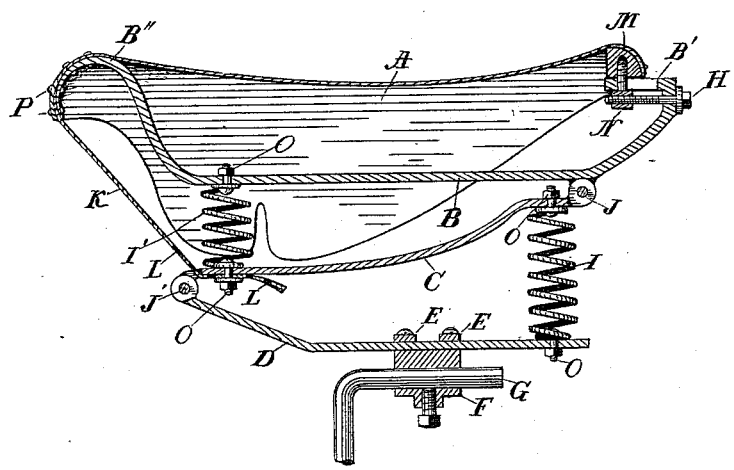

Figure 1 is a rear view of saddle. Fig. 2 is a sectional side view of same on line *x x* of Fig. 1.

Similar letters refer to similar parts.

My invention has for its object the construction of a strong easy-riding bicycle-saddle by a novel arrangement of springs and tighteners.

I describe my invention with reference to the drawings, as follows:

A is the seat of the saddle.

The frame of the saddle is composed of three members B, C, and D. The upper member B is bent upward and inward at the rear to receive plate of saddle, as shown at B', and bent upward and forward to receive neck of saddle, as shown at B''. The central member C of the frame is joined to B by the hinge J at the rear, and by a similar hinge J' at the front is connected with the lower member D, which is fastened by bolts E E to block F on rod G, attached to bicycle-frame by suitable set-screw. The rear ends of the members C D are connected by means of the spiral spring I, and a similar spring I', at the forward end of C, supports the upper member B. Said springs are secured by the bolts O.

To the front end of saddle is attached the strap K by rivets P, having at its lower end several holes L, and fastened to the middle member of frame C by the same bolt which fastens lower end of spring I'. The saddle, it will be seen, can be raised or lowered in front, according as said strap is let out or drawn up.

The rear end of seat is fastened to frame by means of the top screw, it passing upward through a slot in that portion of frame shown as B', and embedded in saddle-plate M. Said top screw is provided with a head drilled and threaded to receive the screw H, by means of which saddle may be tightened at pleasure.

I am aware that bicycle-saddles with springs are common, and do not claim the same, broadly; but What I do claim as new, and for which I desire Letters Patent, is—

1. A saddle for bicycles, having a frame composed of three members B, C, and D, connected by hinges and supported at front and rear by springs, and having a strap from nose of saddle, with holes at lower end for regulating attachment of same, as shown and described.

2. A saddle for bicycles, having a frame composed of three members B, C, and D, arranged one above another and connected by hinges, and supported at front and rear by springs, and means, substantially as described, connecting the upper member B with one of the lower members, whereby the upward motion of the former is limited.

3. In a bicycle-saddle, the combination, with the seat, of the strap K, extending from the nose of saddle and having the holes L L, through which the lower end of strap is attached to saddle-frame as desired, as shown and described.

4. A bicycle-saddle having, in combination, a rear tightener consisting of a top screw, it having a drilled and threaded head passing upward through slot in saddle-frame into saddle-plate, the tightening-screw H, passing through rear end of frame and engaging said top screw, the spiral spring I I', and the strap K, fastened to peak of saddle-seat, with holes in lower end where same is fastened to lower saddle-frame, all as shown and described, and for the purpose set forth.

In testimony whereof I affix my signature in presence of two witnesses.

RALPH BENTON HAIN.

Witnesses:
ADOLPH B. MASON,
GRACE G. CHAPMAN.